(12) United States Patent
Dumm et al.

(10) Patent No.: US 7,562,858 B2
(45) Date of Patent: Jul. 21, 2009

(54) WEAR AND TEXTURE COATINGS FOR COMPONENTS USED IN MANUFACTURING GLASS LIGHT BULBS

(75) Inventors: Timothy Francis Dumm, Westerville, OH (US); Kan-Yin Ng, Columbus, OH (US)

(73) Assignee: Diamond Innovations, Inc., Worthington, OH (US)

( * ) Notice: Subject to any disclaimer, the term of this patent is extended or adjusted under 35 U.S.C. 154(b) by 119 days.

(21) Appl. No.: 11/377,777

(22) Filed: Mar. 16, 2006

(65) Prior Publication Data

US 2006/0208151 A1 Sep. 21, 2006

Related U.S. Application Data

(60) Provisional application No. 60/662,292, filed on Mar. 16, 2005.

(51) Int. Cl.
*B29C 33/56* (2006.01)

(52) U.S. Cl. .............. 249/114.1; 249/115; 249/134; 425/808; 65/26; 65/374.1; 106/38.2; 106/38.22; 106/38.9; 427/133

(58) Field of Classification Search ...... 249/114.1–116, 249/139, 115, 134; 425/808; 65/26, 305, 65/374.15, 374.1; 106/38.27, 38.28, 38.9, 106/38.2, 38.22; 427/133, 135, 230, 239, 427/245; 428/432

See application file for complete search history.

(56) References Cited

U.S. PATENT DOCUMENTS

| | | | |
|---|---|---|---|
| 3,244,497 A | 4/1966 | Copeland | |
| 3,617,363 A * | 11/1971 | Metzger et al. | 427/383.7 |
| 3,762,882 A * | 10/1973 | Grutza | 428/615 |
| 3,936,577 A | 2/1976 | Christini et al. | |
| 4,063,907 A * | 12/1977 | Lee et al. | 51/295 |
| 4,139,677 A | 2/1979 | Blair et al. | |
| 4,168,961 A | 9/1979 | Blair | |
| 4,197,902 A * | 4/1980 | Von Jan et al. | 164/418 |
| 4,243,728 A | 1/1981 | Sato et al. | |
| 4,399,167 A * | 8/1983 | Pipkin | 427/217 |
| 4,612,160 A * | 9/1986 | Donlevy et al. | 419/2 |
| 4,747,864 A | 5/1988 | Hagerty et al. | |
| 4,854,496 A * | 8/1989 | Bugle | 228/193 |
| 4,906,532 A | 3/1990 | Spencer, Jr. | |
| 4,997,686 A | 3/1991 | Feldstein et al. | |
| RE33,767 E | 12/1991 | Christini et al. | |
| 5,145,517 A | 9/1992 | Feldstein et al. | |
| 5,171,347 A * | 12/1992 | Monji et al. | 65/64 |
| 5,202,156 A * | 4/1993 | Yamamoto et al. | 427/135 |
| 5,302,450 A | 4/1994 | Rao et al. | |
| 5,340,373 A * | 8/1994 | Miyazaki | 65/24 |
| 5,380,349 A * | 1/1995 | Taniguchi et al. | 65/286 |

(Continued)

FOREIGN PATENT DOCUMENTS

EP 1 010 674 6/2000

(Continued)

*Primary Examiner*—Philip C Tucker
*Assistant Examiner*—Dimple N Bodawala
(74) *Attorney, Agent, or Firm*—Maria C. Gasaway

(57) ABSTRACT

The present disclosure relates to a quench mold that may include an interior cavity and a coating on the interior cavity. The coating may include a plurality of particles such as metal-coated particles.

13 Claims, 11 Drawing Sheets
(4 of 11 Drawing Sheet(s) Filed in Color)

U.S. PATENT DOCUMENTS

| | | | | |
|---|---|---|---|---|
| 5,382,274 | A | * | 1/1995 | Yamamoto et al. .............. 65/26 |
| 5,413,772 | A | * | 5/1995 | Pinneo ....................... 423/446 |
| 5,429,652 | A | * | 7/1995 | Sano et al. ............... 65/374.11 |
| 5,482,637 | A | * | 1/1996 | Rao et al. .................... 508/100 |
| 5,595,639 | A | * | 1/1997 | Sano et al. .................. 205/109 |
| 5,779,752 | A | * | 7/1998 | Landa et al. ................... 65/68 |
| 5,928,771 | A | * | 7/1999 | DeWald et al. .............. 428/216 |
| 5,997,640 | A | * | 12/1999 | Berthold et al. ............. 117/200 |
| 6,162,497 | A | * | 12/2000 | Beane et al. ................ 427/215 |
| 6,162,552 | A | * | 12/2000 | Bewlay et al. .............. 428/655 |
| 6,309,583 | B1 | | 10/2001 | Feldstein |
| 6,334,335 | B1 | * | 1/2002 | Hirota et al. ................... 65/66 |
| 6,548,453 | B1 | * | 4/2003 | Narasimhan et al. ........ 508/106 |
| 6,641,663 | B2 | * | 11/2003 | Kemmochi et al. ......... 117/200 |
| 6,656,597 | B2 | * | 12/2003 | Takahara .................... 428/432 |
| 6,663,682 | B2 | * | 12/2003 | Baldoni et al. ................ 51/307 |
| 6,868,699 | B2 | | 3/2005 | Oiwa et al. |
| 7,022,403 | B1 | * | 4/2006 | Lakhotkin et al. ........... 428/216 |
| 2005/0022457 | A1 | | 2/2005 | Chen et al. |
| 2005/0112399 | A1 | * | 5/2005 | Gray et al. ................... 428/678 |
| 2005/0173834 | A1 | * | 8/2005 | Lucek et al. ................. 264/319 |
| 2007/0157670 | A1 | * | 7/2007 | Sung ........................... 65/102 |

FOREIGN PATENT DOCUMENTS

| | | | |
|---|---|---|---|
| GB | 1 333 055 | | 10/1973 |
| GB | 1333055 A | * | 10/1973 |
| GB | 2039879 A | * | 8/1980 |
| JP | 57083757 A | * | 5/1982 |
| JP | 63100027 A | * | 5/1988 |
| JP | 10330122 A | * | 12/1998 |
| WO | WO 2004/072357 | | 8/2004 |
| WO | WO 2004/094685 | | 11/2004 |
| WO | WO 2004094685 A2 | * | 11/2004 |
| WO | WO 2005/002742 | | 1/2005 |

* cited by examiner

WEAR AND TEXTURE COATINGS FOR COMPONENTS USED IN MANUFACTURING GLASS LIGHT BULBS

CROSS-REFERENCE TO RELATED APPLICATION

This patent application claims priority to, and incorporates by reference in its entirety, U.S. Provisional Patent Application No. 60/662,292, entitled "Wear and Texture Coatings for Components Used in Manufacturing Glass Light Bulbs" and filed Mar. 16, 2005.

BACKGROUND

In the modern manufacturing process used for making various types of light bulbs, a high-speed ribbon machine is used. The glass ribbon machine takes a thin, molten strip of glass and presses out bulbs at the rate of up to 2000 bulbs per minute or more. The key features of the machine are: a glass ribbon, a metal tip through which air is blown, an orifice plate that the glass ribbon rides upon and conveys the bulbs, and a quench mold or rotating split mold that cools the bulb to the desired shape and dimensions. The process is such that a molten ribbon of glass rides on top of a chain of steel plates, wherein each plate contains an orifice that is the size of the open end of the bulb. As the glass ribbon rides on the chain of plates, a tip presses the glass ribbon into the orifice and blows air to force the glass to drop through the orifice into a teardrop shape. As soon as the bulb is the desired size, a pair of molds that have been soaked in water, will cover the bulb without touching it. The heat of the molten glass instantly turns the water to steam, and the steam quenches the glass to its final form. A push rod then ejects the bulb from the orifice plate, and the bulb falls onto a conveyor belt for further processing.

The primary area or component of wear on the ribbon machine and similar types of high-speed bulb making machines is the quench mold. Although there is typically no significant direct contact between the glass and the inner surface of the mold, the combination of hot steam and heat work to degrade the surface texture of the mold. The degradation is often so severe that the bulbs must be changed every 2 to 5 days of continuous operation. This causes considerable amounts of downtime and cost.

Significant amounts of time and labor are used for applying a sacrificial coating to the quench molds. As depicted in FIG. 1A, a mold section 10 may include a housing 11 and an interior cavity section 12. The interior sections may include one or more vents 13 and a coating to both retain moisture and reduce adhesion of the glass to the mold cavity. This coating may be made by painting a resin, such as linseed oil, onto the bare steel surface of the inside of a mold. While the oil is still wet, a tightly sized cork dust may be sprinkled onto the oil layer. This oil is then allowed to air dry, after which the excess cork is tapped off of the coating. The molds are placed into an oven and baked for 3 to 4 hours at 400° F. The resulting coating is a very rough and highly convoluted texture with a high surface area that is good for holding or retaining water. When measured using a Hommel surface profilometer, the surface roughness ($R_a$) may be about 40 microns. In addition, the surface may have a peak-to-valley height ($R_{max}$) of about 250 microns and a mean peak-to-valley distance of about 200 microns. FIGS. 1B and 1C depict photomicrographs of this prior art coating on a bulb quench mold at 15× and 150× magnification, respectively.

Although the prior art cork coatings work well, such coatings typically last for only about 2 to 5 days in continuous production on a ribbon machine. On a large machine, there may be as many as 200 mold sets that must be changed out at one time. The downtime to replace these parts is often 1 to 2 hours, resulting in a loss of production of 12,000 to 24,000 bulbs, plus the cost of the coatings.

The disclosure contained herein is directed to solving at least some of the problems described above.

SUMMARY

In an embodiment, the present disclosure relates to a quench mold that may include an interior cavity and a coating on the interior cavity wherein the coating may include a plurality of metal-coated particles. In an embodiment, the particles may include superabrasive particles and the metal may include titanium, chromium, nickel, cobalt, copper, tantalum, iron, or silver. In an embodiment, the particles may include graphite particles. In various embodiments, the metal-coated particles may also be coated with a superabrasive material. In a further embodiment, the particles may include graphite with a superabrasive coating material and the metal may include copper or nickel. The coating may have an overall thickness of about 50 to about 500 microns and may retain a volume of water having a volume that is about 0.4 mm³ to about 0.9 mm³ per cubic millimeter of the coating.

In an alternate embodiment, the coating may include a plurality of superabrasive particles in a metal matrix. The superabrasive particles may include a diameter of from about 0.1 µm to about 50 µm and the metal may include nickel, chrome, copper, cobalt, or alloys thereof. The coating may include a thickness of about 50 µm to about 500 µm. In another embodiment, the coating may include a plurality of metal particles in a metal matrix. The metallic particles may include, for example, copper, steel, brass, bronze, or cobalt.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Before the present compositions and methods are described, it is to be understood that this invention is not limited to the particular compositions, methodologies, or protocols described, as these may vary. It is also to be understood that the terminology used in the description is for the purpose of describing the particular versions or embodiments only, and is not intended to limit the scope of the present invention which will be limited only by the appended claims.

It must also be noted that as used herein and in the appended claims, the singular forms "a", "an", and "the" include plural reference unless the context clearly dictates otherwise. Thus, for example, reference to a "superabrasive particle" is a reference to one or more superabrasive particles and equivalents thereof known to those skilled in the art, and so forth. Unless defined otherwise, all technical and scientific terms used herein have the same meanings as commonly understood by one of ordinary skill in the art. Although any methods and materials similar or equivalent to those described herein can be used in the practice or testing of embodiments of the present invention, the preferred methods, devices, and materials are now described. All publications mentioned herein are incorporated by reference. Nothing herein is to be construed as an admission that the invention is not entitled to antedate such disclosure by virtue of prior invention.

A superabrasive material is any material having a Vickers hardness of greater than about 3000 kg/mm$^2$, or optionally more than about 3200 kg/mm$^2$. In various embodiments, we have found that the application of superabrasive composite materials, such as those using diamond or cubic boron nitride (cBN) to certain components in a glass bulb manufacturing process may reduce wear, maintenance shutdowns, and total production cost while improving energy efficiency by maintaining critical equipment tolerances more effectively. In particular, we have found that diamond or cBN composites may provide a durable and corrosion resistant coating that is capable of retaining a high level of water for components such as light bulb quench molds. This may allow quench molds to be coated with a durable coating, and it may allow them to function more consistently and longer in the bulb making process. Several types of composite coatings, including but not limited to superabrasive coatings, are described herein to provide the improved component performance. Based on this disclosure, one skilled in the art will recognize that other superabrasive coatings also may be used.

Figure 1A:
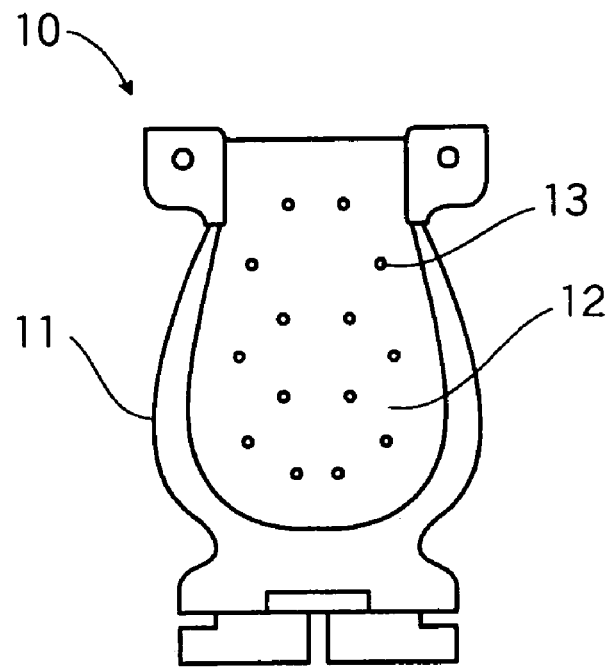
FIG. 1A shows an exemplary glass light bulb quench mold.
Figure 1B:
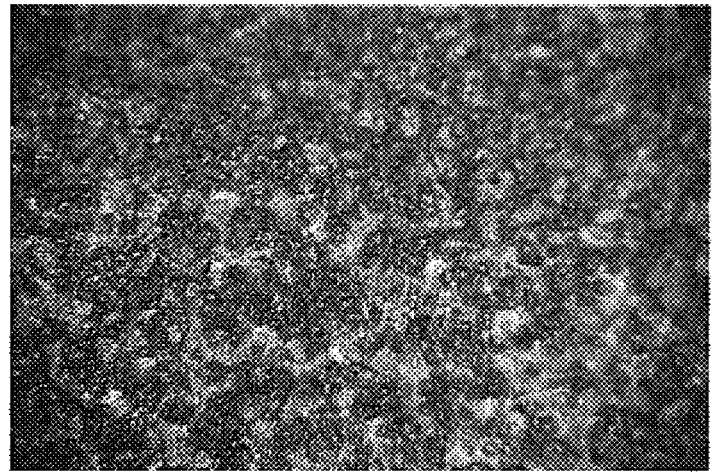
FIG. 1B depicts a photomicrograph of the prior art coating at 15× magnification.
Figure 1C:
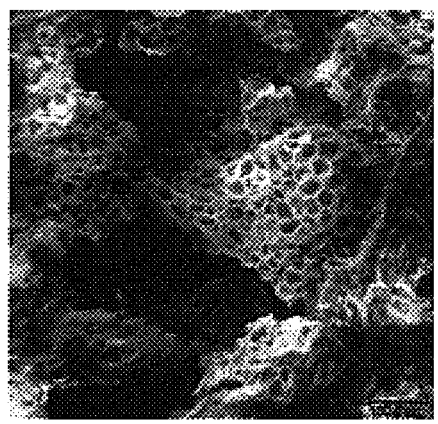
FIG. 1C depicts a photomicrograph of the prior art coating at 150× magnification.
Figure 2:
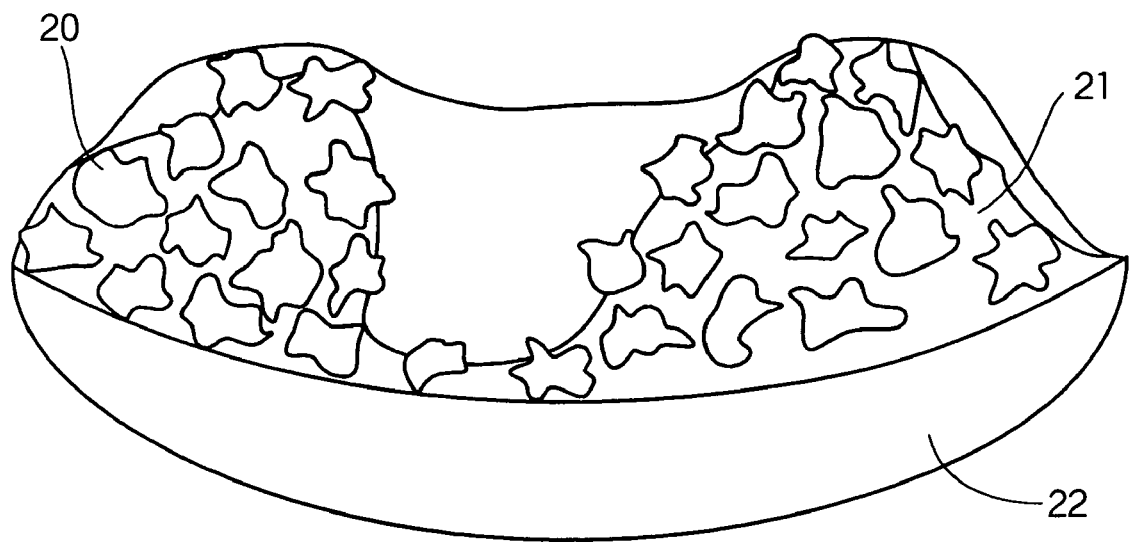
FIG. 2 shows exemplary elements of various coatings of the present disclosure.

In a first embodiment, as represented in FIG. 2, a layer comprising diamond and/or cBN particles 20 and metal 21 may be plated onto the inside surface of a quench mold 22 using either electroless or electrolytic methods. The coating may be highly resistant to abrasive wear, form a smooth surface, resist corrosion, and conduct both heat and electricity. Suitable methods of plating are generally described in, for example, U.S. Pat. Nos. 4,997,686 and 5,145,517, the disclosures of which are incorporated herein by reference in their entirety. Since the coating can be applied to a structural material, such as steel, reinforced composites, ceramics, or plastics, catastrophic failure in service may be reduced. Part life may be extended due to the improved abrasion, erosion, and corrosion resistance imparted by the coating. The layer of diamond or cBN may have a diameter thickness that is equal to more than the average size of one superabrasive particle, and the metal may include, without limitation, nickel, chrome, cobalt or copper or alloys thereof. The average particle size of superabrasive particles used may range from about 0.1 µm to about 50 µm in maximum outside diameter, or optionally from about 0.25 µm to about 1.0 µm in diameter. Other sizes are possible. Preferred, although optional, coating layer thicknesses may range from about 50 µm to about 500 µm, or from about 100 µm to about 200 µm in various embodiments.

Figure 3:
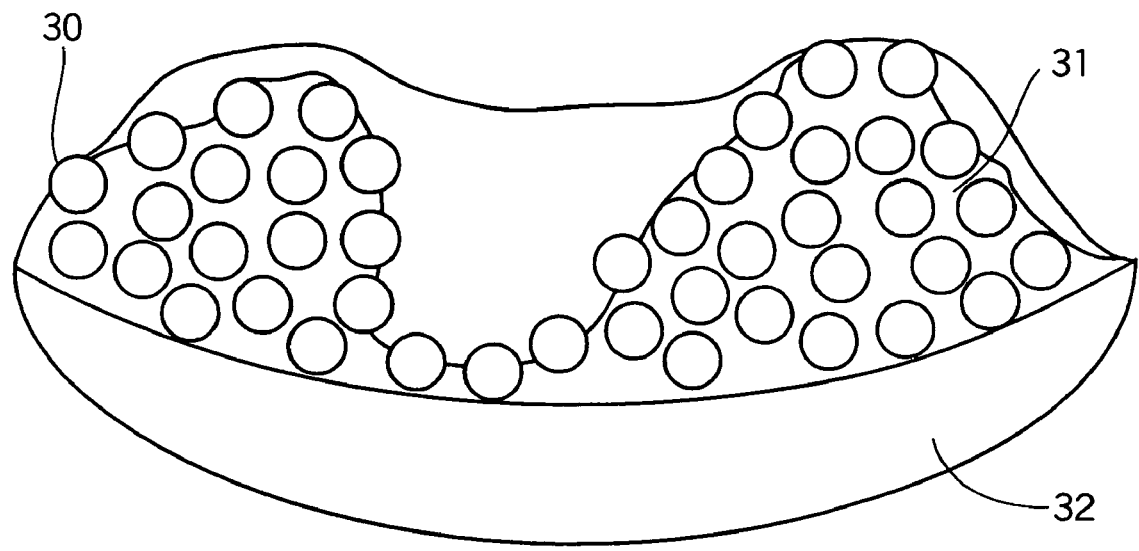
FIG. 3 shows exemplary elements of alternate coatings of the present disclosure.

In a second embodiment, as represented by FIG. 3, a layer of copper or other metallic particles 30 within a continuous metal matrix 31 may be co-deposited onto a quench mold 32 using either electroless or electrolytic coating methods. This coating may be highly resistant to abrasive wear, form a rough and convoluted surface, resist corrosion, conduct both heat and electricity, and retain a significant amount of surface moisture. Since the coating may be applied to a structural material, such as steel, reinforced composites, ceramics or plastics, catastrophic failure in service may be reduced. Part life may be extended due to the improved abrasion, erosion, and corrosion resistance imparted by the coating, but may not be extended as long as a similar coating using diamond particles. The softer coating may still be harder than cork, but it may not expose the glass component to diamond that may potentially create micro-scratching. The layer of metal particles may include, without limitation, copper, steel, brass, bronze, or cobalt, and it may have a thickness of at least one particle. The continuous metal matrix may include, without limitation, nickel or copper. As with the first embodiment, in the second embodiment, preferred (but not required) particle sizes may range from about 0.1 µm to about 50 µm, or from about 0.25 µm to about 1.0 µm. Preferred (but not required) coating thicknesses may range from about 50 µm to about 500 µm, or from about 100 µm to about 200 µm.

Figure 4:
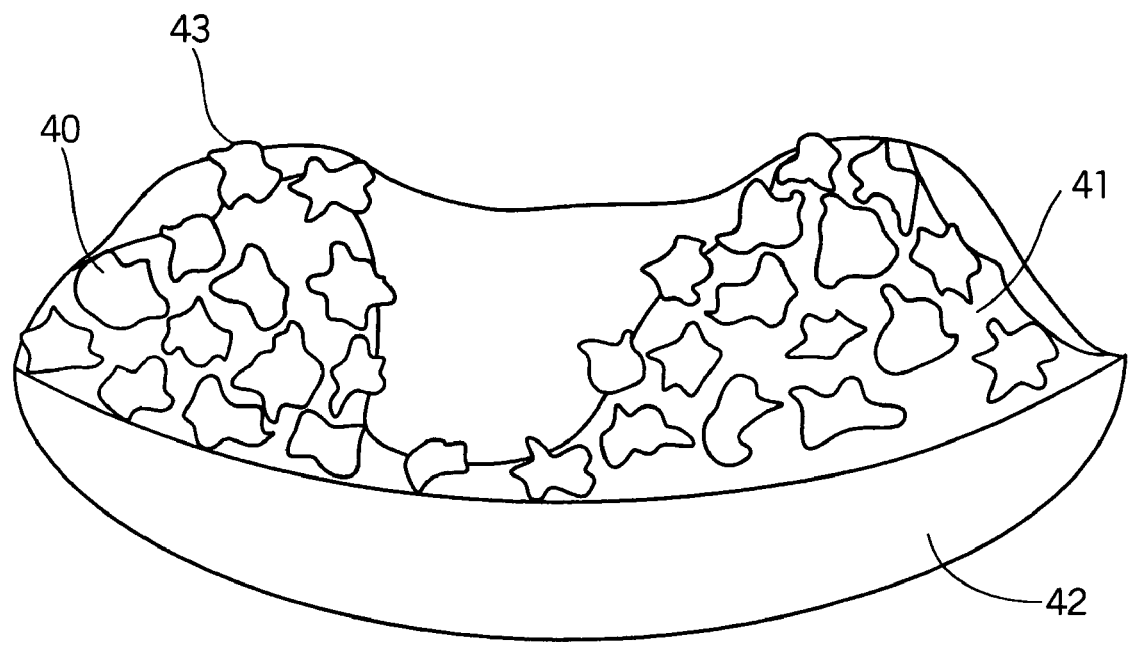
FIG. 4 shows a third embodiment of a coating of the present disclosure.

In a third embodiment, as represented by FIG. 4, a layer of metallic-coated diamond or cBN particles 40, within a metal matrix 41, may be plated onto the inside surface of a quench mold 42 using either electroless or electrolytic methods. The metallic coating 43 on the surface of the diamond or cBN particles 40, which may include, without limitation, titanium, chromium, nickel, cobalt, copper, tantalum, iron, silver or combinations or multiple layers of any of the above, may allow the coating layer of the present disclosure to achieve the desired function. The coating layer may have a thickness of more than one superabrasive particle and the metal matrix may include, without limitation, nickel or copper. For example, preferred (but not required) particle sizes and coating layer thicknesses may be similar to those described for the first and second embodiments above. The metallic coating on the surface of the superabrasive particles may or may not coat the entire surface of each particle. Preferably, the metallic coating has a maximum thickness that is less than the maximum diameter of the superabrasive particle.

Figure 5:
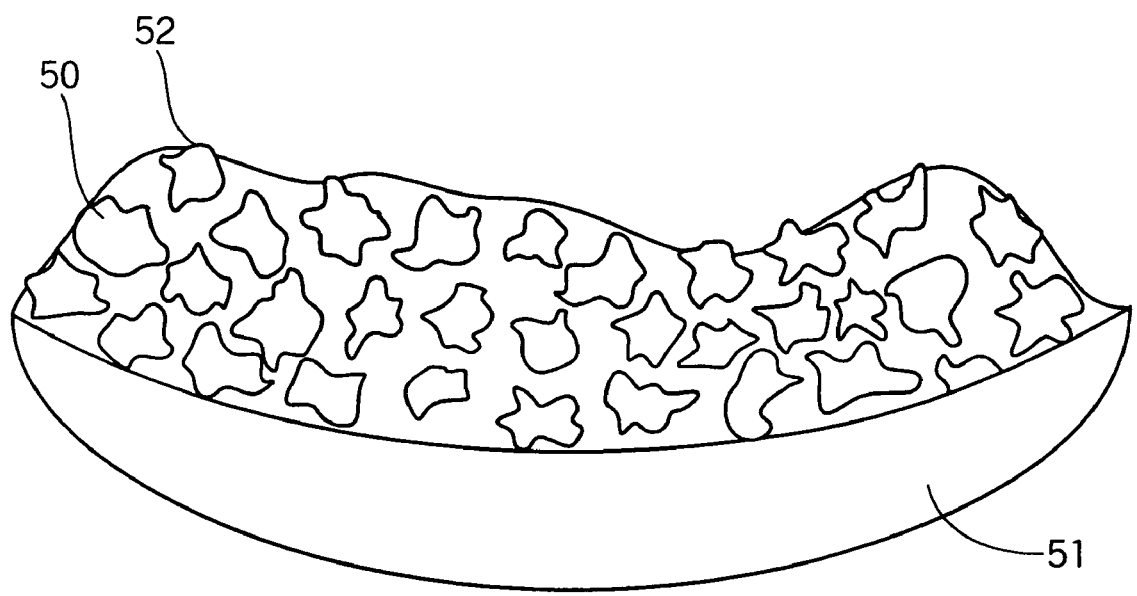
FIG. 5 shows a fourth embodiment of a coating of the present disclosure.

In a fourth embodiment, as represented in FIG. 5, a quench mold interior cavity 51 may be coated with a layer of metal-coated graphite particles 50. The layer may be applied to a quench mold 51 via a thermal spray process. One skilled in the art would know that other processes may be used to apply the layer. In addition, the metallic coating 52 on the particles may include, without limitation, nickel or copper. The metal-coated graphite particle layer applied in this technique may be a relatively porous and open-structure and may be capable of retaining a considerable amount of water. In some embodiments, the graphite particles 50 may range in size from about 10 to about 500 microns. In another embodiment, the particles 50 may be available in sizes ranging from 50 to 150 microns. Other particle sizes are possible. The particle layer may have a thickness of between about 0.001 inches to about 0.050 inches. Alternately, the particle layer may have an overall thickness of about 0.1 to about 500 µm, about 50 µm to about 500 µm, about 100 µm to about 200 µm, or of other suitable sizes. The weight-percentage of metal to graphite may be about 85% metal to about 15% graphite. In an alternate embodiment, the weight-percentage of metal to graphite may be about 60% to about 40%, respectively. Alternate ranges may include about 75% metal to about 25% graphite, or about 80% metal to about 20% graphite. Other solid lubricants like hexagonal boron nitride (hBN), talc, $MoS_2$, or other materials may be used instead of graphite. In addition to the porous nature of the metal-graphite coatings, the coated graphite particles may also provide a non-wetting surface against the molten glass. This attribute may prevent the molten glass from sticking to the coating before it is quenched.

Figure 6:
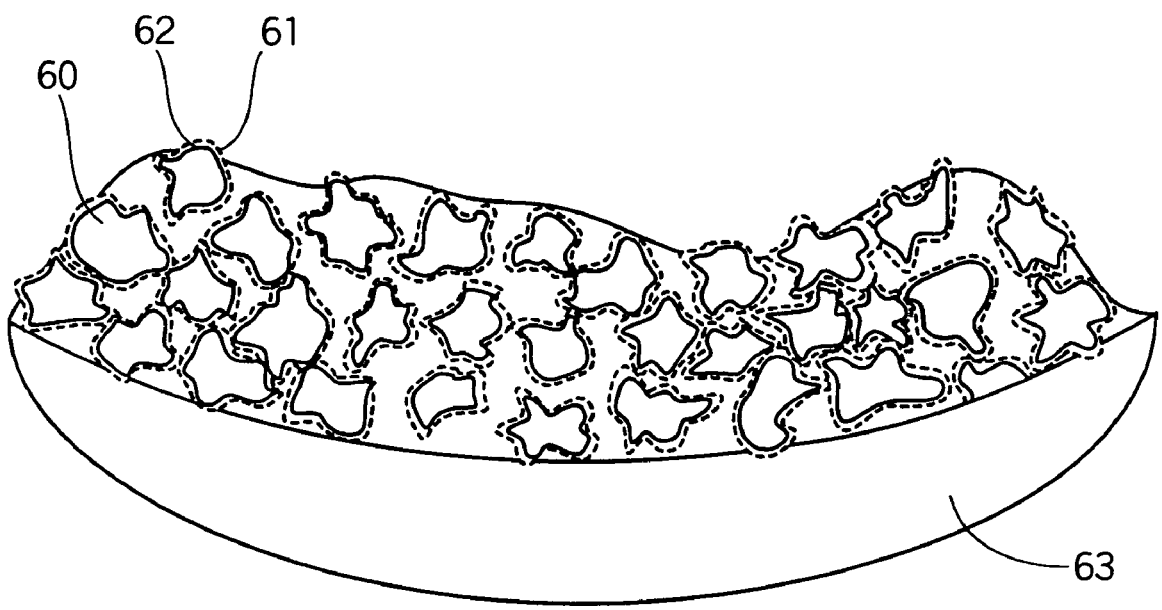
FIG. 6 shows a fifth embodiment of a coating of the present disclosure.

In a fifth embodiment, as represented in FIG. 6, a layer of metal-graphite particles 60 as described above, may include an additional coating of a superabrasive material such as diamond or cubic boron nitride 61. The additional coating 61 may be applied to a quench mold 63 to strengthen the metal-graphite coating 62 and improve abrasion resistance. The composite coating 61 added to the metal-graphite coating 62 may be thin, such as about 1 micron to about 25 microns, or about 2 microns to about 10 microns, so that the overall porosity and water retention capability of the metal-graphite coating 62 is not significantly reduced. Since the metal-graphite coating 62 may have an open structure, optionally the additional coating 61 may uniformly coat all of the exposed metal-graphite coating 62. The composite overcoat 61 may also improve adhesion between the metal-graphite coating 62 and the relevant graphite particle 60.

In a composite coating method that uses electroless chemistry for co-depositing hard-particles such as superabrasives or silicon carbide, boron carbide, alumina or other particles, the particles may be inert to the electroless chemistry in which they are suspended. For example, the diamond particles suspended in an electroless plating bath may not be autocatalytic to the nickel dissolved in solution and nickel may not deposit on the surface of the diamond. When co-deposition of nickel and diamond particles occurs in this case, the resulting composite layer may be uniform and may conform to the substrate that the coating is applied to. For example, if a steel panel having a surface roughness $R_a$ of about 0.1 microns is coated with a composite coating having diamond particles having a particle size of about 8 microns, the resulting surface roughness of the coating may be about 0.8 microns as-plated.

However, when a metallic layer is deposited onto the surface of the superabrasive or graphite particles, this layer may become autocatalytic to the nickel or other plating metal in a plating bath. Thin layers of titanium and/or chrome may be deposited onto the diamond or cBN particles using chemical vapor deposition (CVD) and/or physical vapor deposition (PVD) techniques. Optionally, the coating on each particle may comprise less than 50% of the over all diameter of each particle. In various embodiments, the coating thickness may be less than about 20%, 10%, 5% or even 1% of the overall particle size. One skilled in the art would know that other techniques could be used. In this case, when finely divided particles that include a metallic coating, such as titanium or chrome, are added to a plating bath, the surface area of the metal coating may be significantly higher than what is normally recommended for the stable operation of the bath. When the bath is suitably activated such that autocatalytic deposition of metal from the plating solution occurs, metal in solution begins plating at a high rate primarily because of the high surface area of metal that may be coated on the particles. The metal-coated particles may become entrapped on the surface of the substrate being coated, but because of the rapid depletion of metal from the plating solution, the coating layer may form quickly and may have many nodules that create the appearance of the cork and resin surface. The resulting surface features of this coating may have a surface roughness of about 40 microns, a peak to valley height of about 250 microns, and a mean peak-to-valley distance of about 200 microns, and may have the ability to retain surface moisture. Deviations of +/−50% are possible for each of these values. The overall thickness of the composite coating in this case may be on the order of about 200 to about 500 microns, although other sizes are possible, which is thicker than composite coatings made with particles that do not have metallic coatings. It is also worth noting that the nodular features formed by the rapid decomposition of the plating bath may be on the order of about 50 microns to about 300 microns in diameter. Other sizes are possible.

Since the metallic coating adheres to the mold substrate, the composite coating may be highly resistant to abrasive wear. The coating may be applied to a structural material, such as steel, reinforced composites, ceramics, or plastics and, therefore, may reduce catastrophic failure in service. Part life may be extended due to the improved abrasion, erosion, and corrosion resistance imparted by the coating.

Coatings described herein may provide suitable porosity and water retention characteristics. For example, in some embodiments, after soaking a coated quench mold in water, the coated article may retain a volume of water that is as much as about 0.4 mm$^3$ to about 0.9 mm$^3$ per cubic millimeter of the coating.

EXAMPLES

A primary function of a light bulb quench mold is for retaining moisture on the surface of and within the pores of the coating. The effectiveness of a quench mold is directly proportional to the amount of water that can be retained in the coating. A technique was developed for measuring the moisture retention of coatings on thin steel panels that have been coated with the composite diamond coatings (CDC). A series of lab tests were conducted whereby several small (2 in.x3 in.) steel panels were coated with CDC-8, CDC-15, CDC-Ti (as described in more detail below) and the above-mentioned cork coating.

The CDC-8, -15 and -Ti coatings were applied to the steel panels using techniques based on U.S. Pat. No. RE 33767, the disclosure of which is incorporated herein by reference, and using technology described in U.S. Pat. No. 6,306,466, the disclosure of which is incorporated herein by reference. The CDC-8 coating was made of 8 µm diamond particles in a matrix of electroless nickel phosphorous and the thickness of the coating was approximately 0.002 inches. The CDC-15 coating was made of 15 µm diamond particles in a matrix of electroless nickel phosphorous and the thickness of the coating was approximately 0.002 inches. The CDC-Ti coating was made of 8 µm diamond particles having a titanium coating on the outer layer of the diamond in a matrix of electroless nickel phosphorous and the thickness of the composite coating was greater than 0.004 inches.

Example 1

A cork/resin panel was weighed on a scale and tared to zero, then dipped in water to a common level in a beaker of water. Excess water was shaken off and the panel was immediately weighed and the weight of retained moisture was recorded. The panel was then allowed to stand in an upright position for one minute and then re-weighed. The series of standing and weighing was repeated for seven minutes. As can be seen from the results in FIG. 7, the cork coating that is the standard coating used in quench molds today retained about 0.48 grams of water.

Example 2

Panels were coated with composite diamond coating made with 8 μm diamond (CDC-8) and with 15 μm (CDC-15) diamond and were weighed on a scale and tared to zero, then dipped in water to a common level in a beaker of water. Excess water was shaken off and the panels were immediately weighed and the weight of retained moisture was recorded. The panels were then allowed to stand in an upright position for one minute and then re-weighed. The series of standing and weighing was repeated for seven minutes. As can be seen from the results in FIG. 7, the composite diamond coatings on the panels containing CDC-8 and CDC-15 diamond retained approx. 0.10 grams of water.

Example 3

Figure 7:
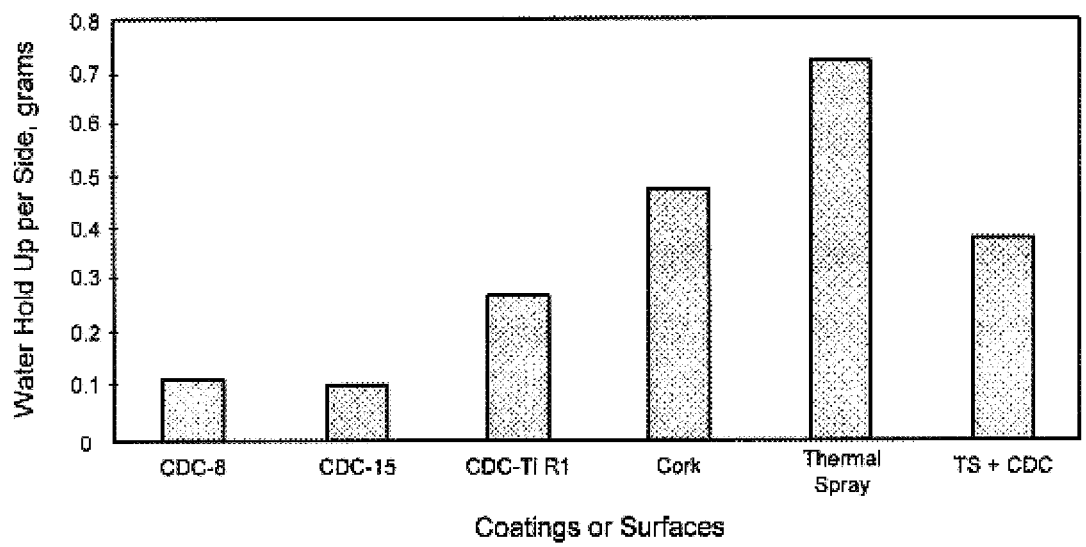
FIG. 7 shows the initial water retention of various coatings.
Figure 8:
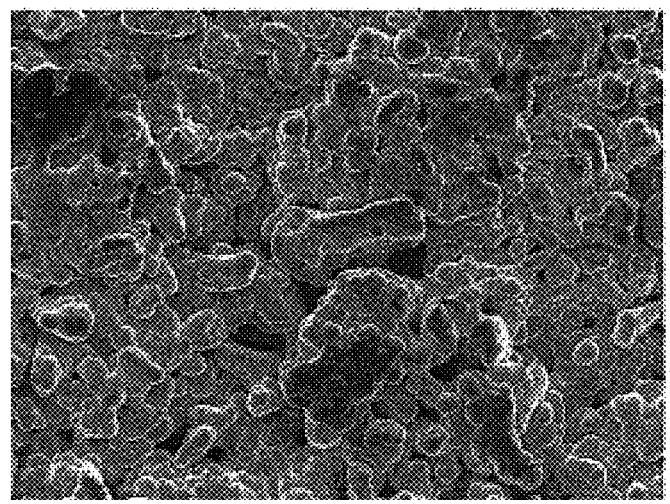
FIG. 8 depicts a microscopic image of a titanium coated diamond coating of the present disclosure.

A panel coated with composite diamond coating made with 8 μm diamond that was coated with a thin layer of titanium (Ti assay of 30% by weight) was weighed on a scale and tared to zero, then dipped in water to a common level in a beaker of water. Excess water was shaken off and the panel was immediately weighed and the weight of retained moisture was recorded. The panel was then allowed to stand in an upright position for one minute and then re-weighed. The series of standing and weighing was repeated for seven minutes. FIG. 8 depicts a microscopic image of a titanium coated diamond coating of the present disclosure. As can be seen from the results in FIG. 7, the composite diamond coating having the Ti-coated diamond particles (CDC-Ti) retained approximately 0.26 grams of water.

Example 4

Figure 9:
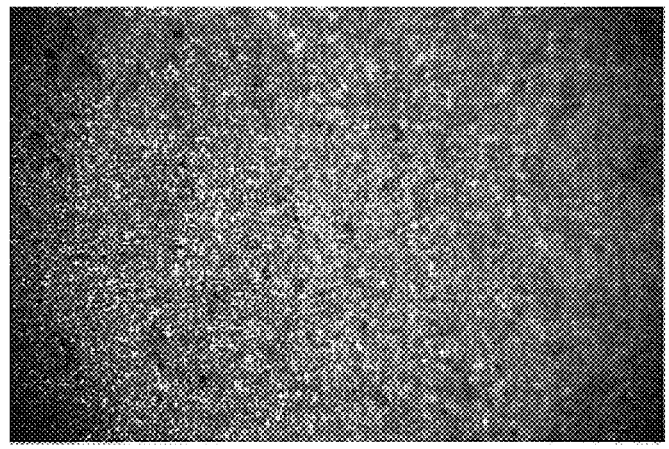
FIG. 9 depicts a microscopic image of the composite coated nickel-graphite particle coating of the present disclosure as applied to a mold set surface.
Figure 10:
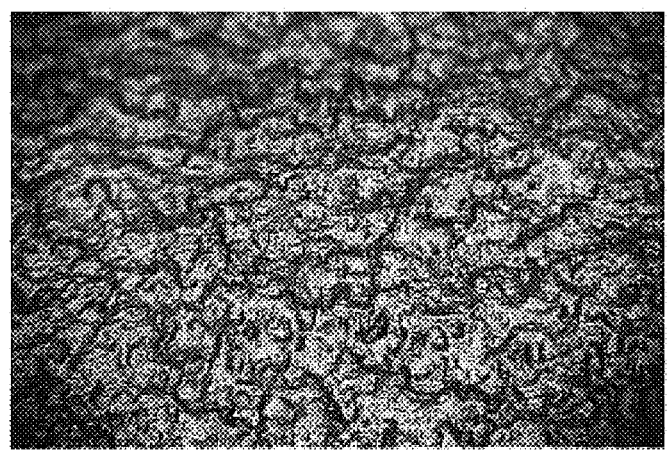
FIG. 10 depicts a microscopic image of the composite coated nickel-graphite particle coating of the present disclosure as applied to a textured mold set surface.

In a full-scale production ribbon machine used for making conventional incandescent light bulbs, the main component of interest and testing was the bulb quench mold. In the test, two new mold sets were obtained from a large inventory of similar molds that were for a high-volume standard bulb. The test included applying composite diamond coating to one set of molds. This coating utilized 8 μm diamond at a diamond volume concentration of approximately 40% and a thickness of 0.001 inches (25 μm). To the other mold set, the inner surface of the mold was first laser engraved to impart a texture that was similar to that of the existing sacrificial coating. After the mold was engraved, a similar composite diamond coating was applied that was used in the first mold set. The resulting surface for mold set 1 is shown in FIG. 9, and the resulting surface for mold set 2 is shown in FIG. 10.

Example 5

Figure 11:
FIG. 11 depicts a microscopic image of the nickel graphite coating of the present invention.

Steel panels were coated with a nickel-graphite coating. Prior to coating, the surface of the panels were cleaned with alcohol to remove any surface grease and then were grit-blasted with a #30 aluminum oxide powder to induce surface roughness. A base layer of Metco 450 thermal spray coating was applied at approx. 0.002 inches for bonding of the nickel-graphite layer. The nickel-graphite powder used was 307NS, which is commercially available from Sulzer Metco. This powder was applied using a Type 5P gun using oxy-acetylene gas with system parameters recommended by Sulzer Metco. The nickel-graphite layer was applied at 0.004 inches and 0.015 inches. FIG. 11 is a microscopic image of the nickel-graphite coating on a steel panel. A water retention test was performed on the nickel-graphite panel and the total amount of water retained in the coating was measured. As shown in FIG. 7, the amount of water retained by the steel panel coated on one side (thermal spray) is approximately 0.72 grams.

Example 6

Figure 12:
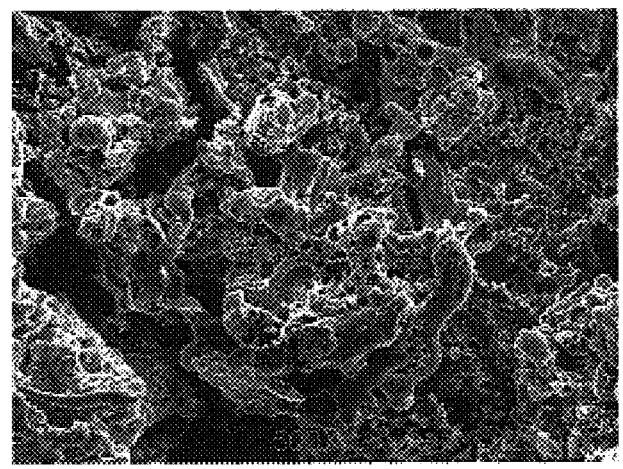
FIG. 12 depicts a microscopic image of a composite coated nickel-graphite particle coating of the present disclosure.

A steel panel derived from Example 5 was further processed by applying a composite coating as described in Example 2. The composite coating in this example used a 2 micron diamond particle in an electroless nickel matrix. The thickness of the coating is about 10 microns. As can be seen from FIG. 12, the diamond, graphite particle and nickel matrix are clearly seen. Water retention and abrasion tests were also performed on this panel and the other test panels from previous examples. Results of the water retention test are shown in FIG. 7 (TS+CDC) where it can be seen that the panel retained about 0.38 grams of water.

Wear Resistance. For all of the panels tested in the previous examples (except for the cork/linseed oil coating) Taber test panels (4 in.×4 in.×⅛ in steel) were also coated with the respective coatings and abrasion tests were performed using a set of CS10 abrasion wheels under 1 kg load. Values are reported as mg weight loss per 1000 cycles. The results of the Taber abrasion test are shown in Table 1 below. It can be seen that the composite diamond coatings using 8 micron coatings have the most wear resistance followed by the Ti-coated diamond composite coatings. The composite diamond coatings using 15 micron diamond had values of 3 mg weight loss per 1000 cycles whereas the Taber values of the nickel-graphite thermal spray were the highest at approx 550 mg per 1000 cycles. It can be seen from Table 1 that by adding a thin layer of composite nickel diamond coating to the thermal spray coating results in a Taber value of 20 thereby improving the wear resistance 50× over the nickel-graphite coating alone without a significant reduction in water retention.

TABLE 1

Taber Wear Values for Coatings

| Coating | Taber Wear Index |
| --- | --- |
| CDC-8 | 0.5 |
| CDC-15 | 3 |
| CDC-Ti R1 | 1 |
| Nickel-Graphite Thermal Spray | 536 |
| Nickel-Graphite TS + CDC | 21 |

These examples demonstrate the utility of the composite diamond or composite particulate coatings as a way of replacing the cork/resin coating with a high-water retentive coating. Because this coating is more durable and can last longer than cork/resin, the molds can be left on the ribbon machine longer and less labor will be needed for re-coating the molds. This may result in more productivity for the user.

Although the disclosure has provided considerable detail with reference to certain preferred embodiments thereof, other versions are possible. Therefore the spirit and scope of the appended claims should not be limited to the description and the preferred versions contained within this specification.

What is claimed is:

1. A quench mold, comprising:
   a component having an interior cavity; and
   a coating on a surface of the interior cavity of the component, wherein the coating comprises a plurality of metal-coated particles, wherein the metal-coated particles further comprise a coating of a superabrasive material and wherein the metal-coated particles having the coating of the superabrasive material have a porous open-structure.

2. The quench mold of claim 1, wherein the coating on a surface of the interior cavity of the component further comprises a metal matrix.

3. The quench mold of claim 1, wherein the metal-coated particles comprise a metallic coating of titanium, chromium, nickel, cobalt, copper, tantalum, iron, silver or combinations or multiple layers thereof.

4. The quench mold of claim 1, wherein the metal-coated particles comprise graphite particles.

5. The quench mold of claim 1, wherein the coating on the interior cavity retains a volume of water having a volume that is about 0.4 mm$^3$ to about 0.9 mm$^3$ per cubic millimeter of the coating.

6. The quench mold of claim 3, wherein the metal-coated particles comprise graphite and the metallic coating comprises copper or nickel.

7. The quench mold of claim 2, whereby the metal matrix comprises nickel, chrome, copper, cobalt, or alloys thereof.

8. The quench mold of claim 1, whereby the coating on the surface of the interior cavity of the component has an overall thickness of about 50 to about 500 microns.

9. The quench mold of claim 1, whereby the metal-coated particles comprise one or more of graphite, hexagonal boron nitride, talc, and MoS$_2$.

10. The quench mold of claim 1, wherein the superabrasive material comprises cubic boron nitride particles.

11. The quench mold of claim 1, wherein the additional coating of a superabrasive material has a thickness of about 1 μm to about 25 μm.

12. The quench mold of claim 3, wherein the metallic coating comprises about 60 weight % to about 80 weight % of the metal-coated particles.

13. The quench mold of claim 3, wherein the metallic coating has a thickness of about 200 microns to about 500 microns.

* * * * *